H. Waterman,
Cotton Press.
№ 731, Patented May 10, 1838.
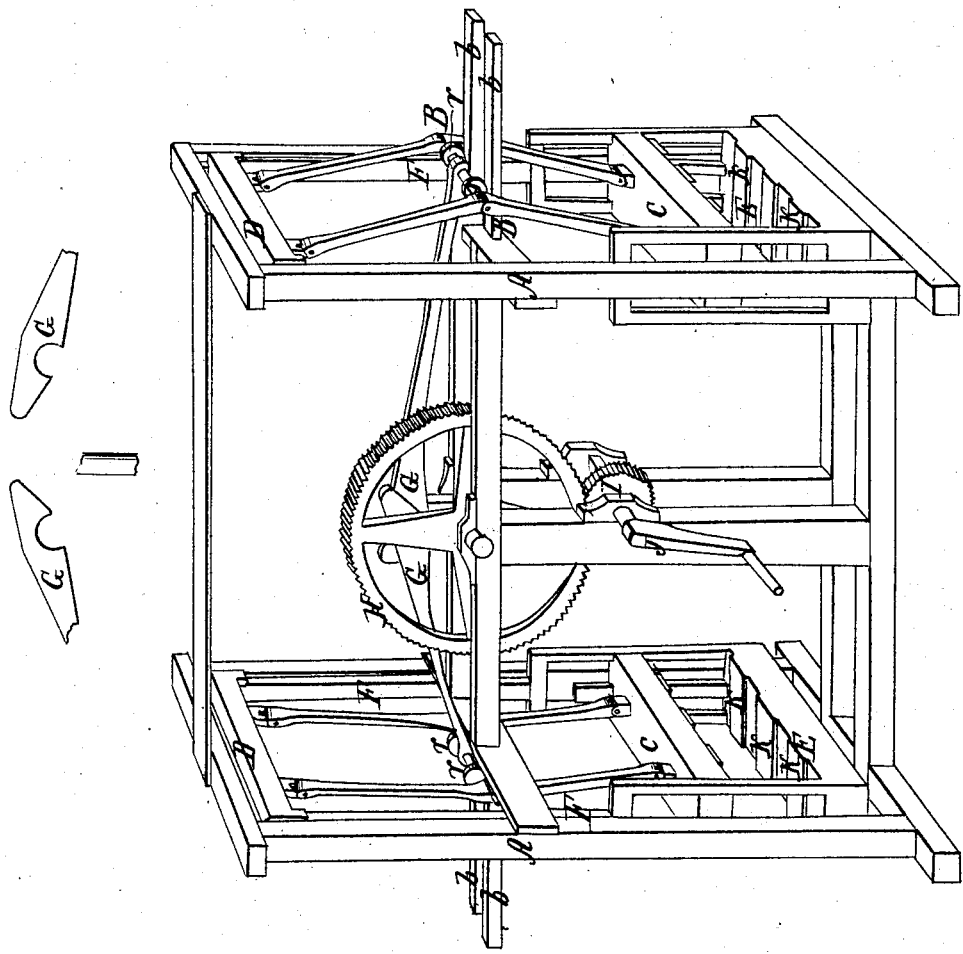

UNITED STATES PATENT OFFICE.

HENRY WATERMAN, OF BATH, MAINE.

IMPROVEMENT IN COTTON-COMPRESSORS.

Specification forming part of Letters Patent No. 731, dated May 10, 1838.

*To all whom it may concern:*

Be it known that I, HENRY WATERMAN, of the town of Bath, in the county of Lincoln and State of Maine, have invented a new and useful Improvement, being a Machine for Pressing Cotton, which is described as follows, reference being had to the annexed drawing of the same, making part of this specification.

A is the frame, made of suitable size and strength for the purpose intended, being composed of six posts, two transverse sills united by two longitudinal sills, two caps, two transverse beams, and two longitudinal beams, and a top brace, having a tongue on the inside of each corner-post, serving as guides for the cross-heads, pistons, and followers in their vertical movements between the posts, grooves being made in the ends of said cross-heads, followers, and pistons to admit said tongues.

B is the toggle-joint for pressing the cotton or other substances, made in the usual manner, except that the cross-head, with its arms and follower, is made movable, in the manner hereinafter described.

C are pistons attached to the lower ends of the toggle-joint for pressing the bale of cotton or other substance on the upper side, guided by the tongues on the posts before described.

D is a movable cross-head attached to the upper ends of the toggle-joint, moving up and down over the tongues in the manner before described.

E is a follower for pressing the bale on the under side, attached to the movable cross-head by the arms or rods F, having an oblong link in each to receive the end of the follower, and large enough to pass over the end of the piston and allow it to play freely up and down therein. These rods or arms may, however, be made straight and pass through or outside the ends of the piston, or arranged in any convenient manner.

G is a connecting-rod leading from the toggle-joint to the crank-shaft, a round rod passing through the toggle-joint and through the end of the connecting-rod, on which rod there are two rollers, *r r*, moving over the projecting ends of the longitudinal beams *b b*, which serve as ways for the rollers to move backward and forward over, in order to guide and steady the toggle-joint.

H is a cog-wheel on the crank-shaft for extending and contracting the toggle-joint.

I is a pinion for turning said cog-wheel.

J is a crank for turning the pinion.

K are parallel slots on the face of the piston and follower, forming spaces to admit the ropes to pass around the bale of cotton or bundle of hay. At the other end of the frame is a similar arrangement of parts, which produces a double machine.

The bale of cotton, bundle of hay, or other article to be pressed is placed between the follower and piston, and receives a simultaneous double pressure from above, as well as below, by means of turning the crank-shaft. This turns the pinion, and this the cog-wheel on the crank-shaft, which moves the arms, and this straightens the toggle-joint and simultaneously causes the piston to descend, being attached to the lower end of the toggle-joint, and the follower to ascend, being attached by the hanging arms to the movable cross-head at the upper end of the toggle-joint, which rises. The cords (if cotton is pressed) are then passed through the spaces formed on the face of the follower and piston by the slots and around the bale of cotton, and are then made fast; or the cords may be placed in the spaces before the bale is put into the machine. A similar operation is performed at the other end of the machine alternately with that just described. The rollers at the same time move backward and forward over the ways and guide the toggle-joint in its movement and keep it in its place.

The invention claimed by me, the said HENRY WATERMAN, and which I desire to secure by Letters Patent, consists—

In the before-described mode of giving the follower a simultaneous movement upward while the piston moves downward, thus pressing the substance placed between them on the bottom as well as the top.

HENRY WATERMAN.

Witnesses:
S. I. TALLMAN,
C. WATERMAN.